United States Patent
Waehrisch et al.

(10) Patent No.: US 10,502,323 B2
(45) Date of Patent: Dec. 10, 2019

(54) SHUT-OFF VALVE FOR INTEGRATION INTO A GAS METER

(71) Applicant: Johnson Electric S.A., Murten (CH)

(72) Inventors: Sten Waehrisch, Dresden (DE); Sten Ritschel, Dresden (DE); Marcus Herrmann, Dresden (DE)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 24 days.

(21) Appl. No.: 15/184,251

(22) Filed: Jun. 16, 2016

(65) Prior Publication Data

US 2016/0369898 A1     Dec. 22, 2016

(30) Foreign Application Priority Data

Jun. 17, 2015   (DE) .................. 10 2015 109 694

(51) Int. Cl.
| | |
|---|---|
| *F16K 31/04* | (2006.01) |
| *F16K 31/50* | (2006.01) |
| *F16K 1/42* | (2006.01) |
| *F16K 1/12* | (2006.01) |
| *F16K 31/53* | (2006.01) |
| *G01F 15/00* | (2006.01) |

(52) U.S. Cl.
CPC .................. *F16K 1/42* (2013.01); *F16K 1/12* (2013.01); *F16K 31/047* (2013.01); *F16K 31/508* (2013.01); *F16K 31/53* (2013.01); *G01F 15/005* (2013.01)

(58) Field of Classification Search
CPC .............................. F16K 31/047; F16K 31/508
See application file for complete search history.

(56) References Cited

U.S. PATENT DOCUMENTS

| | | | | |
|---|---|---|---|---|
| 4,203,466 | A | * 5/1980 | Hager ................. | F16J 15/062 137/543 |
| 4,541,608 | A | * 9/1985 | Forester .............. | F16K 3/0254 251/191 |
| 4,747,741 | A | * 5/1988 | Stadler ................ | B65D 90/626 202/262 |

(Continued)

FOREIGN PATENT DOCUMENTS

| | | |
|---|---|---|
| DE | 8530979 U1 | 2/1994 |
| DE | 19716377 A1 | 10/1998 |

(Continued)

OTHER PUBLICATIONS

Office Action issued in corresponding EP Application No. 16174659.9, dated Mar. 28, 2019, 8 pages.

(Continued)

*Primary Examiner* — Seth W. Mackay-Smith
(74) *Attorney, Agent, or Firm* — Muncy, Geissler, Olds & Lowe, P.C.

(57) ABSTRACT

A shut-off valve for integration into an intelligent gas meter for residential or industrial gas supply, has an inlet, an outlet and a valve seat having a lip seal. A shut-off body is longitudinally displaceable with respect to the valve by a motor driven transmission, using a nut-threaded-spindle drive, to engage with or disengage from, the seal to open or close the valve. The transmission of the valve remains largely unbiased in the closed state while maintaining the gas-tightness of the valve.

3 Claims, 8 Drawing Sheets

(56) References Cited

U.S. PATENT DOCUMENTS

| | | | | |
|---|---|---|---|---|
| 5,233,910 | A | * | 8/1993 | Laichinger ......... B60G 17/0565 137/625.49 |
| 5,295,907 | A | * | 3/1994 | Akkerman ............ F16D 27/105 192/56.33 |
| 6,026,855 | A | * | 2/2000 | Jackson ........... B60K 15/03504 137/512.15 |
| 6,129,105 | A | * | 10/2000 | Hec .......................... A62C 4/02 137/75 |
| 6,223,851 | B1 | * | 5/2001 | Furumi ................ B62D 5/0424 180/404 |
| 7,375,446 | B2 | | 5/2008 | Suzuki et al. |
| 8,274,245 | B2 | * | 9/2012 | Biester ................ F16H 25/2454 137/81.1 |
| 9,151,653 | B2 | | 10/2015 | Endt et al. |
| 2007/0181838 | A1 | | 8/2007 | Muramatsu |
| 2007/0256747 | A1 | * | 11/2007 | Morris .................. F16K 31/047 137/625.65 |
| 2009/0127485 | A1 | * | 5/2009 | Wessel ................. F16K 31/047 251/69 |
| 2010/0117013 | A1 | | 5/2010 | Laurent et al. |
| 2011/0060711 | A1 | | 3/2011 | Macready et al. |
| 2011/0115319 | A1 | | 5/2011 | Schade et al. |
| 2015/0060711 | A1 | * | 3/2015 | Wahrisch .............. F16K 31/045 251/129.12 |

FOREIGN PATENT DOCUMENTS

| | | |
|---|---|---|
| DE | 10248616 A1 | 5/2004 |
| EP | 0683842 A1 | 11/1995 |
| EP | 0836701 A1 | 4/1998 |
| EP | 0987477 A2 | 3/2000 |
| EP | 1482224 A1 | 12/2004 |
| EP | 2239174 A2 | 10/2010 |
| EP | 2441994 A1 | 4/2012 |
| EP | 2700857 A1 | 2/2014 |
| EP | 2843277 A1 | 3/2015 |
| EP | 3070380 A1 | 9/2016 |

OTHER PUBLICATIONS

Office Action dated Dec. 18, 2017 in corresponding EP Application No. 16 174 659.9, 7 pages.

Office Action dated Feb. 7, 2019 in corresponding EP Application No. 16 174 659.9, 6 pages.

* cited by examiner

SHUT-OFF VALVE FOR INTEGRATION INTO A GAS METER

CROSS REFERENCE TO RELATED APPLICATIONS

This non-provisional patent application claims priority under 35 U.S.C. § 119(a) from Patent Application No. DE102015109694.3 filed in Germany on Jun. 17, 2015, the entire contents of which are hereby incorporated by reference.

FIELD OF THE INVENTION

This invention relates to a shut-off valve for integration into a gas meter, especially a so-called intelligent gas meter for residential or industrial gas supply and to a method for operating the shut-off valve.

BACKGROUND OF THE INVENTION

In the measuring housing provided with a gas inlet and a gas outlet, intelligent gas meters generally contain: two flexible measuring chambers filling in alternation to measure the volume of the gas flowing through, including the control system for the same, a counting device, components for remote querying regarding the counter status, and components for remote switching off/on of the gas flow. A remote switching is, for example, necessary for prepay systems or for disabling the gas meter on the part of the gas supplier. A shut-off valve at the gas inlet, the actuator of which is electrically actuated, functions for this purpose. In the interests of a most compact construction, reduction of working noises, and increase of manipulation safety, the shut-off valve, including its integrated power supply, is usually accommodated in the housing interior of the gas meter. From this fact arise the demands for the smallest dimensions of the shut-off valve, a high operating safety, and a long-term freedom from maintenance, among which demands, in particular, a long-lasting battery-supported mode of operation is also included. The latter requires, in particular, an extremely low energy consumption during switching of the shut-off valve and, if necessary, an improved protection against sparking at the actuator of the shut-off valve.

In contrast to actuators based on solenoid drives, actuators based on specialized electric motors have penetrated the market due to an improved manipulation safety against external influences generated by others; such actuators are largely impervious to wanton strikes, vibrations, and other types of manipulations.

From US2015/0060711 A1, by the same assignee, a shut-off valve with a shut-off body is known which is flange mounted within the gas meter at the gas supply connection, is designed as longitudinally displaceable with respect to a valve seat provided with a lip seal, in that the shut-off body sits on a control rod which is rotatably fixed and longitudinally moved in the valve housing. In the lower part, the control rod forms, with an adjusting nut element, a nut-spindle drive via which the shut-off body allows or shuts off a gas flow through the shut-off valve, depending on the rotational direction of the adjusting nut element. The adjusting nut element is driven by a small direct current motor via a multistage gear transmission.

The gas shut-off valve according to US2015/0060711 A1 has a device limiting the torque of the energized small direct current motor in the shut-off position and/or in the open position of the valve in the form of a purely mechanical torque limiting device, in that, after traveling a predefined travel distance, the control rod disengages from the adjusting nut element and the latter then rotates freely. The travel distance is thus not readjustable without disassembly work.

By using stepper motors, corresponding, for example, to EP 0 836 701 B1 or U.S. Pat. No. 6,129,105, defined travel distances may be implemented using a step specification which is changeable via software; however, stepper motors are comparatively large, expensive, and substantially more complex to control than, e.g. small direct current motors with comparable output. The design of the disclosed shut-off bodies is, in addition, complex from a design-view and demands, due to safety and functionality, a very precise control in order to properly reach the valve seat of the sealing body over the long term.

By using economical miniature direct current motors with a predefined runtime control for shutting off or opening, the problem which has previously emerged is that the direct current motors change their working point depending on the load, and thus the actual opening/closing time of the valve changes during operation, for example, caused by gas pressure or temperature fluctuations. To ensure a complete opening/closing, the small direct current motors were therefore energized significantly longer than would actually be necessary, wherein the shut-off body moves hard up to the stop of the valve seat. For additional safety, multiple seconds are also generally specified, for example, to take fluctuations of the gas pressure into account. In valves with flat seals, which require a high sealing force due to design considerations, the shut-off body therefore moves into the valve seat until the direct current motor is blocked. The direct current motor receives in this state its maximum electrical load until the valve is switched off in a time-controlled way. During the relatively long energizing time, the energy consumption is obviously high, which significantly stresses the battery for power supply, whose service life is significantly reduced, and the motor service life is reduced due to the maximum power flow across the brushes. Furthermore, a jamming of the adjustment components caused by the high compression force may not be reliably excluded during the usual operating conditions (longer inactivity, dropping battery voltage) and environmental conditions (temperature fluctuations from −20° C. to +50° C., air pressure fluctuations).

SUMMARY OF THE INVENTION

Hence there is a desire for an improved shut-off valve with respect to their dimensions, safety, reliability, service life, and costs.

Accordingly, in one aspect thereof, the present invention provides a shut-off valve for integration in a gas meter, comprising a shut-off body which is longitudinally displaceable relative to the valve seat by means of a motor-driven reduction transmission with an integrated nut-threaded spindle drive, wherein that the transmission is unbiased in the closed state of the valve while maintaining a gas-tightness.

Preferably, a biasing stroke is provided for the shut-off body in the closed position which, upon completing the closing process, drops back to an unbiasing stroke which unbiases the transmission while maintaining the gas-tightness.

Preferably, the biasing stroke of the shut-off body is limited by means of a fixed housing stop.

Preferably, the biasing stroke of the shut-off body is limited by means of its impact on a lip seal arranged in the valve seat.

Preferably, the lip seal is pressed against the shut-off body in the closed position, supported by the gas pressure.

According to a second aspect, the present invention provides a method of operating a shut-off valve for a gas meter comprising a shut-off body and a motor actuated transmission for longitudinal displacement of the shut-off body with respect to a valve seat provided with a seal, wherein during the switching of the valve into the closed position, the shut-off body initially carries out a stroke up to the borderline biasing of the transmission and subsequently moves, by means of a small return stroke, into a position which unbiases the transmission while maintaining the gas-tightness of the valve.

Preferably, during the switching of the valve into the closed position, the shut-off body moves directly into a position which unbiases the transmission while maintaining the gas-tightness of the valve.

Preferably, the motor is switched via a control switch, wherein detectors directly or indirectly detect the position of the shut-off body.

Preferably, the shut-off body is actuated from the closed position into the open position in a time-controlled way.

Certain embodiments of the invention may include additional desirable features. A shut-off valve for integration in "smart" gas meters should have as an actuator a small direct current motor known in and of itself and be miniaturized as a whole in such a way that it is also still integrable into gas meters which have a smaller installation space than the meters previously customary on the market. The consumption of electrical energy for functionally reliable switching of the shut-off valve is to be limited to the most necessary to achieve a high service life of the gas meter. The adjusting means should be easily accessible over the entire service life and should not lead to jamming or blocking. Furthermore, the sealing system should be equipped in a preferred variant with such a seal which advantageously uses the gas pressure in order to guarantee a reliable seal even without extremely high electromotor compression force. Finally, the shut-off valve should have an extremely simple, easy-to-assemble, and thus economical design of only a few components and including an inexpensive electrical control and be usable in different meter housings.

Certain embodiments proved a shut-off valve for integration in gas meters has, with respect to its valve seat, a shut-off body, which is moveable in the longitudinal directions and sits on a control rod guided in the longitudinal direction in the valve housing, and the control rod is actuated by a small direct current motor via a reduction transmission. Advantageously, a relatively soft lip seal is arranged in the valve seat. The small direct current motor is controlled by an electric device, which ensures that the entire adjustment system indeed reliably establishes the gas-tightness via the sealing system made of the lip seal and shut-off body; however, the adjustment system/adjustment drive is itself unbiased, whereby, when considered over the operating life, jamming occurrences in the drive may be reliably prevented. A fixed housing stop for the shut-off body, a stop of the shut-off body on the lip seal, or a position detection by means of a suitable sensor may be used as a reference position during the shut-off process. In the first two cases, an evaluation switch for the motor current recognizes the stop of the shut-off body by means of the motor current flow (current increase of the motor current over time, motor torque); in the latter case, the motor current is directly switched off via a sensor switch. If the shut-off body in different embodiments of the invention initially moves past its unbiased seat up to a transmission-biasing seat as a reference position, then the control switch immediately reacts with a polarity reversal of the direct current motor and movement of the shut-off body into a state unbiasing the transmission and, in particular, the nut-threaded spindle drive, after which the motor current is interrupted. This return stroke is preferably time-controlled by technical switching means to a few millimeters, in any case, to a value such that a gas-tightness is safely guaranteed.

As sensors, for example, limit switches, micro sensors, reed contacts, light barriers, or pressure sensors may be used. A suitable control enables economical energy consumption from the integrated battery.

The sealing behavior may be appropriately supported in a preferred variant by a specifically soft lip seal interacting with a domed, flow-optimized shut-off valve, in that the gas pressure which is already being applied is used to increase the sealing effect.

The invention enables the construction of unusually small, aerodynamic, manipulation-secure, low-maintenance, reliable, easy to install, and economical shut-off valves for integration in both intelligent gas meters of the current conventional dimensions, as well as new, significantly smaller gas meters. The use of small direct current motors (largely miniaturized micro electric motors) with significantly lower power consumption than previously, in combination with a reduction transmission and an intelligent control, enables a reduced energy consumption at high adjustment forces during switching of the shut-off valve, by which means an integrated energy store (battery) only needs to be regenerated or replaced after many years. In particular, however, the shut-off body is not moved into such a shut-off operating position, in which remaining there leads to a biasing of the kinematics with the risk of a functional disruption of the valve as a result of jamming. It either automatically unbiases the entire adjustment system after each shut-off command to a level such that the tendency for freezing of the adjusting means as a result of a long idle phase disappears, or the shut-off valve is moved directly into a position, in which the adjustment kinematics remain unbiased within certain limits. Due to the use of specific lip seals and a curved, flow-optimized shut-off body, the sealing behavior improves as a result of the existing gas pressure in the blocked state of the valve and also the flow behavior of the gas passing through in the open state. This enables a minimization of the sealing force which must be applied during operation. In connection with the large translation ratio of the motor torque from the motor gear to the adjusting nut element and thus to the control rod, this enables the use of a particularly tiny small direct current motor with a very low power consumption.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
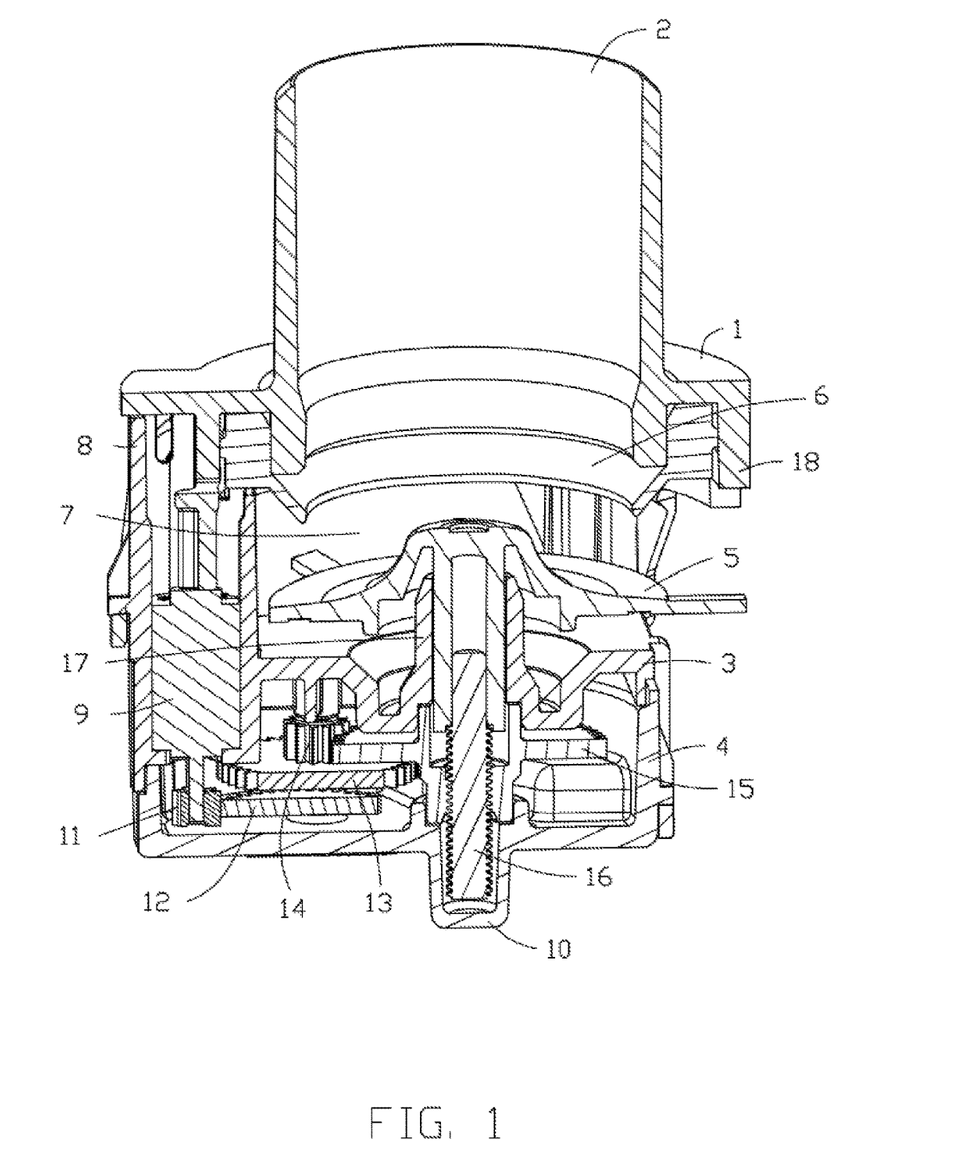
FIG. 1 is a 3D sectional view through a first embodiment of a valve in an open valve position.

A section through a first variant of a gas shut-off valve in a 3D representation may be seen in FIG. 1. The cylindrical plastic housing of the valve is composed essentially from top to bottom from an upper housing part 1 with a gas inlet pipe 2, a plate 3, and a lower housing part 4. A domed and flow-optimized, mushroom-type shut-off body 5 functions for sealing against a lip seal 6 spanning upper housing part 1. Plate 3 is fixed at a specific distance with respect to upper housing part 1, by which means a lateral gas outlet 7 is formed in the open state of the valve. A small separate housing chamber 8 is vertically molded at the periphery on plate 3 and accommodates a small direct current motor 9 which is rotatably fixed, encapsulated, and non-sparking. From housing chamber 8, the electrical connections are guided upwards and out from small direct current motor 9. Lower housing part 4 closes housing chamber 8 at the bottom. Due to the separate housing chamber 8, the micro electric motor may be designed completely encapsulated and may be sealed (not shown) such that the required explosion protection may be reliably guaranteed for the entire service life of the valve. The bottom of lower housing part 4 is depressed as a receptacle 10 for a central, cylindrical control rod 16 to be described later.

The motor shaft of motor 9 projects downward out of separate housing chamber 8, is guided to lower housing part 4, and supports a motor gear 11 on the end side thereof. A reduction transmission made of spur gears, the function of which will be described later, is mounted in the space between plate 3 and lower housing part 4. Motor gear 11 acts on an intermediate gear 12, which is mounted in lower housing part 4 and engages with an additional intermediate gear 13. A small output gear 14 sits on the shaft of intermediate gear 13. Gears 13 and 14 may also be molded or formed as a single part. Output gear 14 drives an adjusting nut element 15 which is mounted between lower housing part 4 and plate 3. During rotation around its axis, adjusting nut element 15 actuates a control rod 16 according to a type of sliding screw drive (nut-threaded spindle drive). Control rod 16 specifically has at the bottom end an outer thread corresponding to the inner thread of adjusting nut element 15 and is biased by adjusting nut element 15. In this way, control rod 16 displaces adjusting nut element 15 translationally, depending on the rotational direction of shut-off body 5, either in the direction of the valve seat or downward in the direction of cylindrical receptacle 10.

Control rod 16 and shut-off body 5 may be made from two separate parts, in that their shafts are inserted rotatably fixed into one another, as depicted, or they may be manufactured from one single plastic molded part in an injection molding process. A sleeve 17 formed on plate 3 ensures the non-rotatability of control rod 16 and shut-off body 5. The mushroom-shaped, streamlined, optimized shut-off body 5 is, in the position drawn relative to the gas outlet 7, drawn in a completely open position. The bottom of cylindrical receptacle 10 functions as a stop for control rod 16 in the open state of the shut-off valve.

Figure 2:
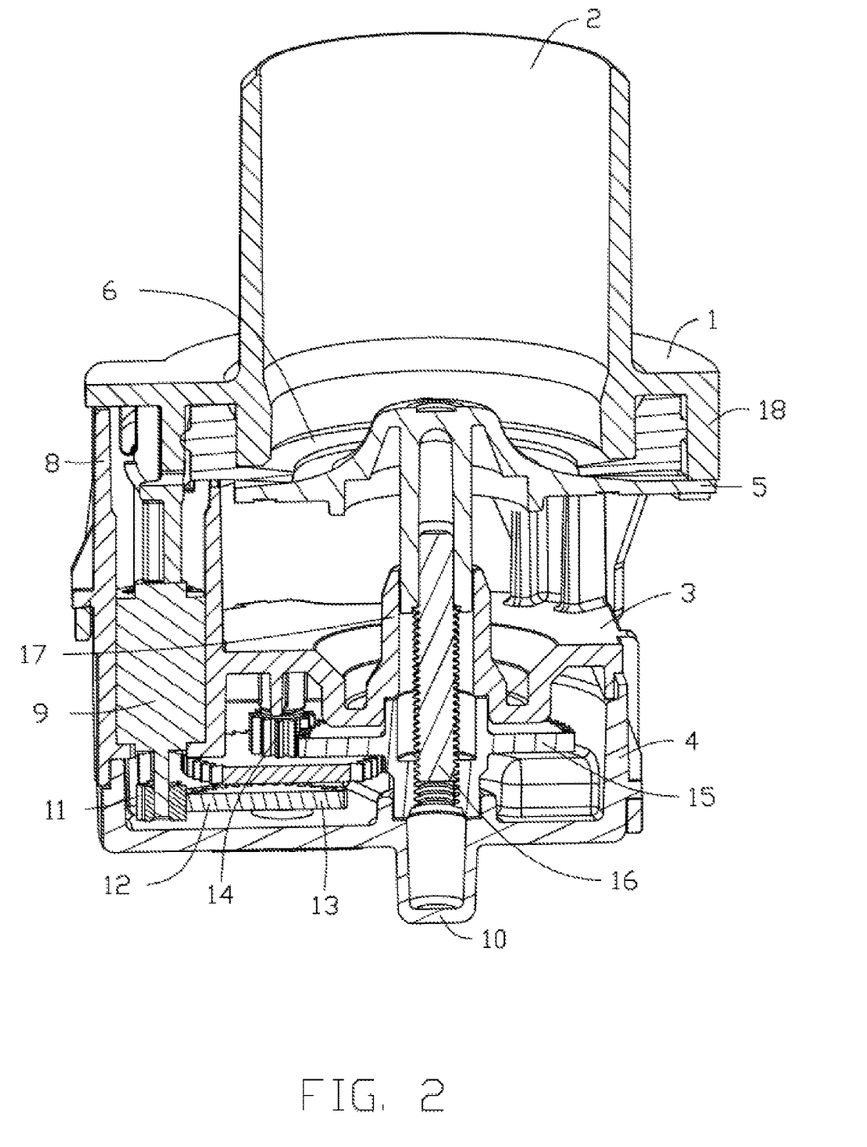
FIG. 2 shows a 3D section through the first valve in a biased, closed valve position.

FIG. 2 shows the valve in a first closed phase in which nut-threaded spindle drive 15, 16 has moved shut-off body 5 upward to the highest point, by means of the motor-driven reduction transmission 12-14 in a motor driven way. This state is achieved according to the first embodiment, in that shut-off body 5 is moved against a fixed stop 18 of upper housing part 1. Hence, the transmission is still in a biased condition urging the shut-off body against the fixed stop 18. A control electronics detects the biased state of nut-threaded spindle drive 15, 16 due to an increase of motor current or a current maximum in motor 9 and reacts by switching off the motor current, reversing the poles of the direct current at motor 9, and a short, time-controlled energizing of motor 9 in the reverse direction.

Figure 3:
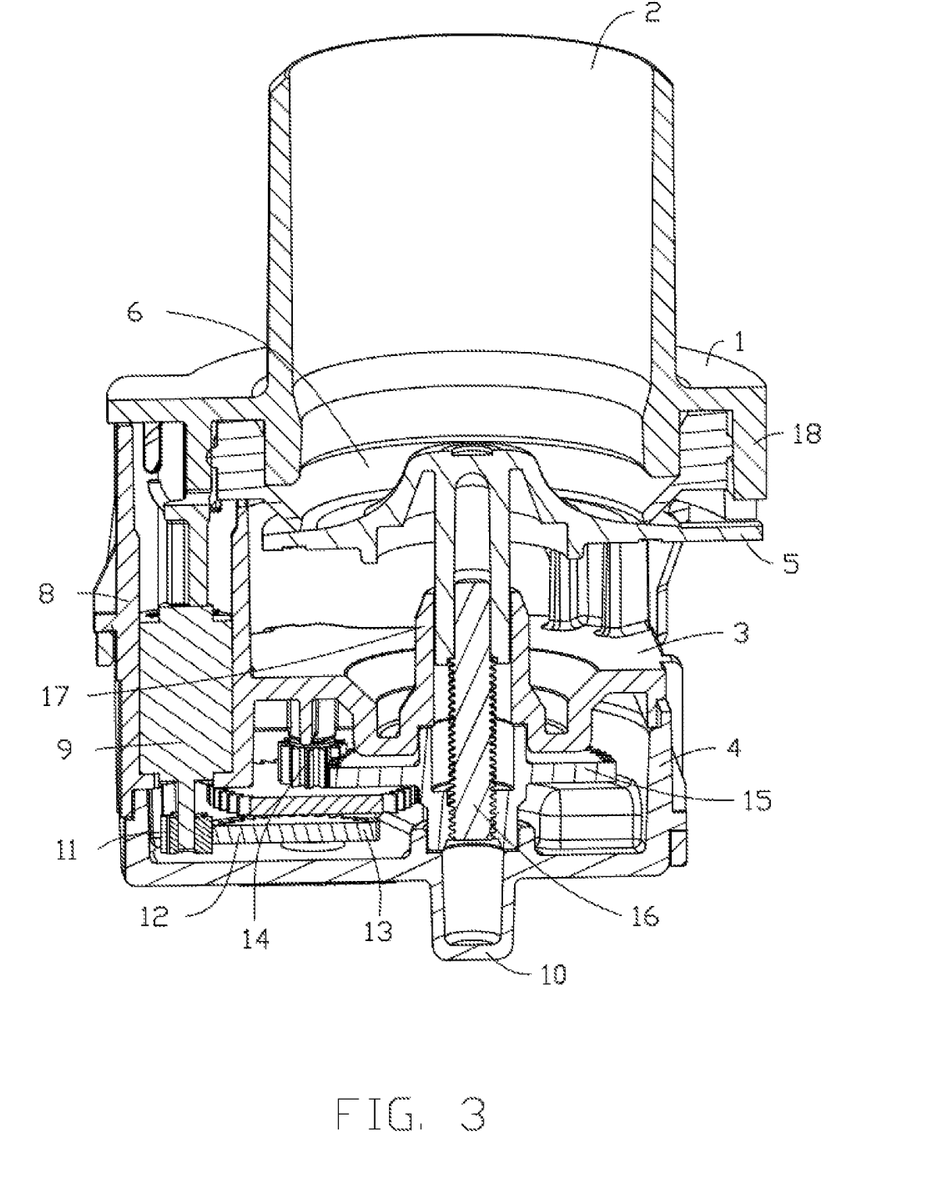
FIG. 3 shows a 3D section through the first valve in an unbiased, closed valve position.

Shut-off body 5 is moved in this concluding phase a very short distance, for example, 1 or 1.5 mm downward, in a time-controlled way, such that shut-off body 5 releases from fixed stop 18 and nut-threaded spindle drive 15, 16 arrives at an unbiased operating state which reliably prevents jamming. In this state, however, the gas-tightness of the valve is further maintained since shut-off body 5 continues to operate against lip seal 6. The gas pressure applied, which affects flexible lip seal 6, additionally supports the gas-tightness. This unbiased, closed state of the valve is shown in FIG. 3.

Figure 4:
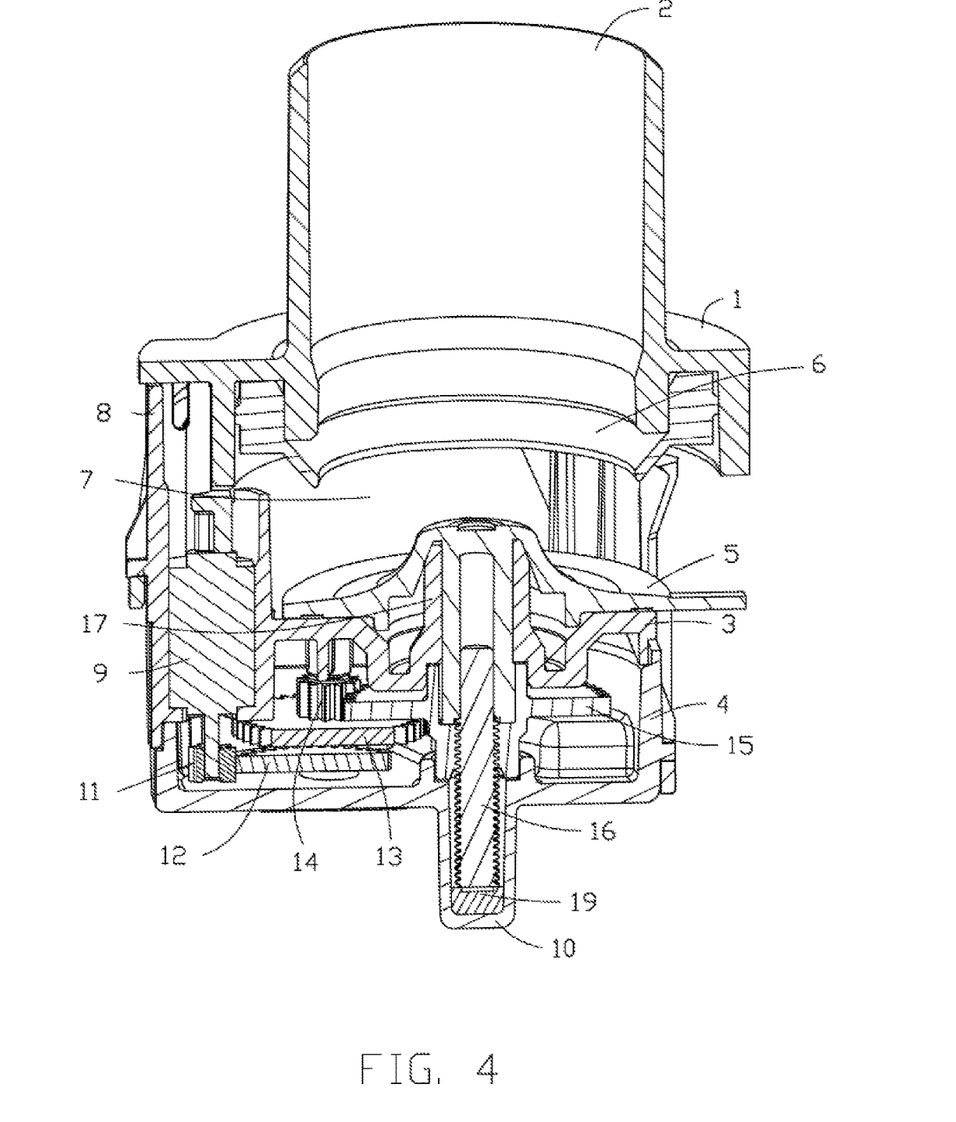
FIG. 4 shows a 3D section through a second embodiment of a valve in an open valve position.
Figure 5:
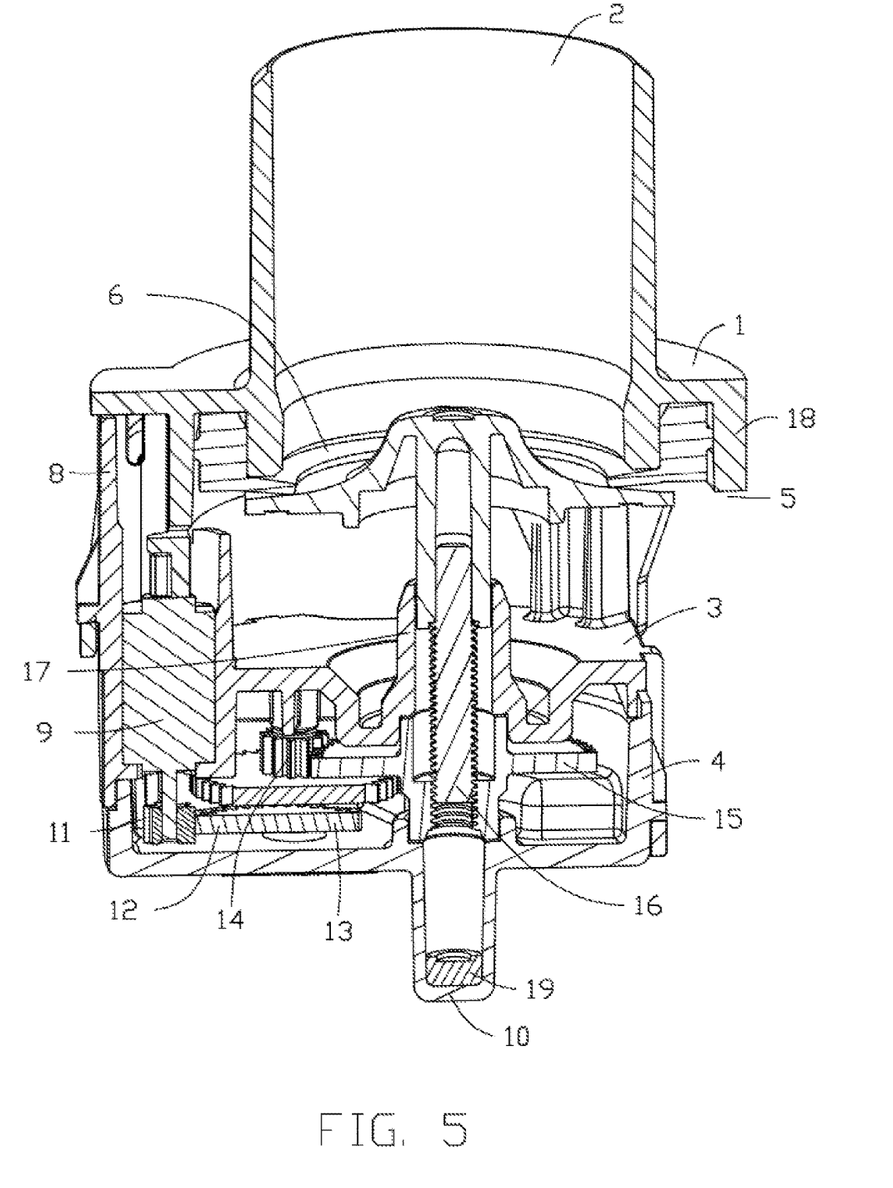
FIG. 5 shows a 3D section through the second valve in a biased, closed valve position.
Figure 6:
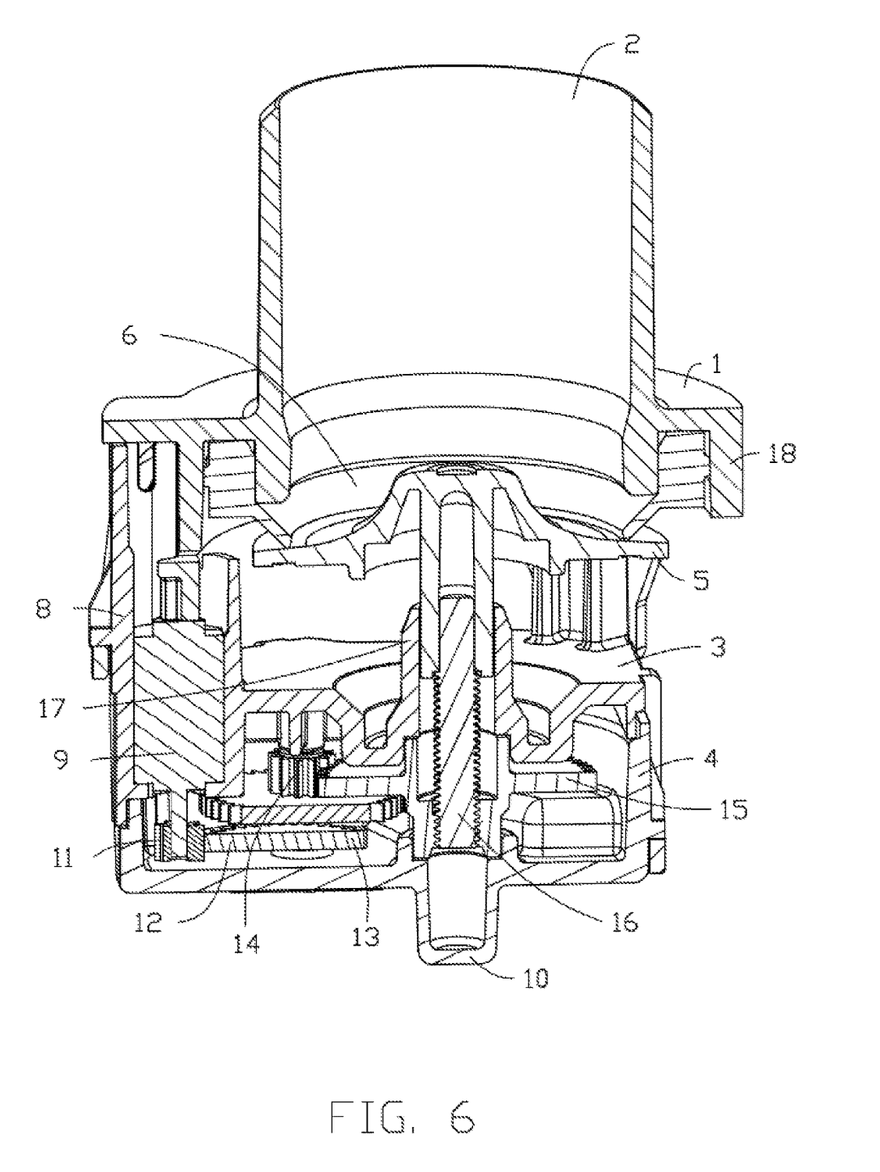
FIG. 6 shows a 3D section through the second valve in an unbiased, closed valve position.

A second embodiment of the invention is graphically depicted in greater detail in FIGS. 4 through 6. The base structure corresponds largely with the first embodiment, for which reason, reference may be made to the preceding embodiment and the explained reference numerals for the purpose of explaining the principle structure and its method of function.

FIG. 4 shows the valve in a completely open position, wherein as a special feature it may be provided, as in common with the other two embodiments, that control rod 16 in the open position does not directly contact bottom 10 of lower housing part 4, but instead abuts on a spring buffer 19. Spring buffer 19 effects a faster starting of control rod 16 during start up from a fully open state.

FIG. 5 shows the valve in a first closed phase in which nut-threaded spindle drive 15, 16 biases shut-off body 5 by means of the motor-driven reduction transmission 12-14 in a motor driven way as a result of the compression force upward at the highest point. This state is achieved according to the second embodiment, in that shut-off body 5 is moved against the resistance of flexible lip seal 5. A control electronics detects the biased state of nut-threaded spindle drive 15, 16 due to an increase of motor current over time or of the motor torque, and reacts in turn by interrupting the motor current, reversing the poles of the direct current at motor 9, and a short, time-controlled energizing interval of motor 9 to operate the motor in the reverse direction.

According to FIG. 6, which depicts the unbiased, closed state of the valve, shut-off body 5 is moved in this concluding phase a very short distance, for example, 1 or 1.5 mm downward, in a time-controlled way, wherein flexible lip seal 5 springs back a little and nut-threaded spindle drive 15, 16 reaches an unbiased operating state which prevents jamming. In this state, however, the gas-tightness of the valve is maintained since shut-off body 5 continues to press lip seal 6. The gas pressure applied, which affects flexible lip seal 6, additionally supports the gas-tightness.

Figure 7:
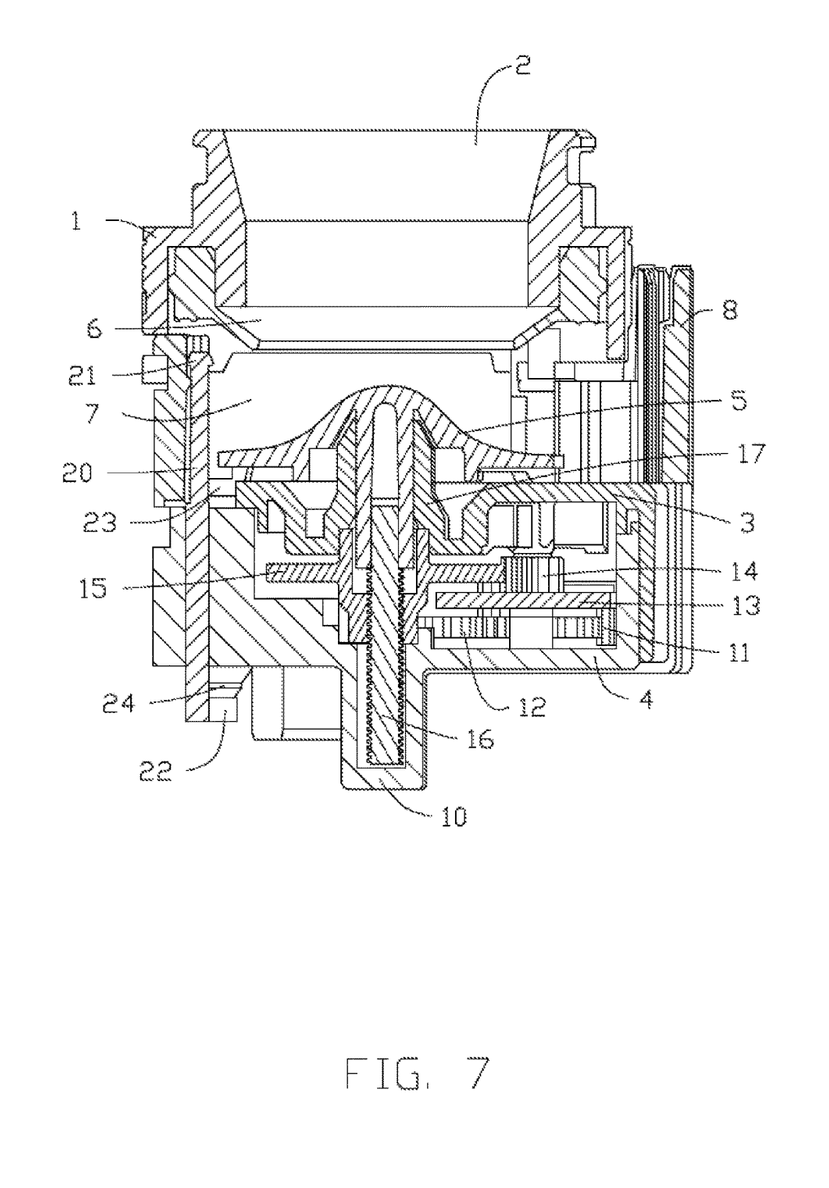
FIG. 7 shows a 3D section through a third embodiment of a valve in an open valve position.
Figure 8:
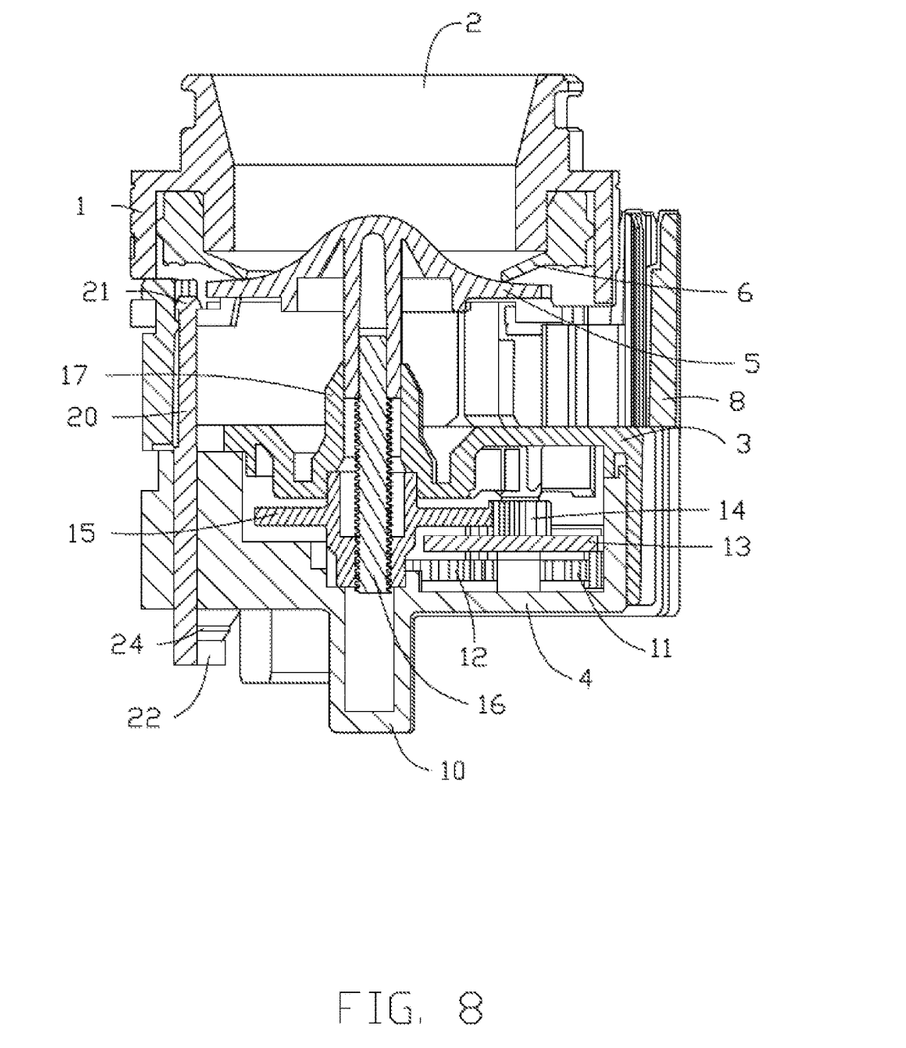
FIG. 8 shows a 3D section through the third valve in a closed valve position.

Finally, FIGS. 7 and 8 show a third embodiment of the valve according to the invention. The basic structure of the valve deviates slightly from the two embodiments described above, without leaving the principle inventive idea.

FIG. 7 shows the valve in the completely open state. The cylindrical plastic housing of the valve is composed essentially from top to bottom from an upper housing part 1 with a gas inlet pipe 2, a plate 3, and a lower housing part 4. A domed and flow-optimized, mushroom-type shut-off body 5 functions for sealing against a lip seal 6 spanning upper housing part 1. Plate 3 is fixed at a distance with respect to upper housing part 1, by which means a lateral gas outlet 7 is formed in the open state of the valve. A small separate housing chamber 8, which is vertically molded at the periphery on plate 3 and accommodates a small direct current motor (not explicitly shown) which is rotatably fixed and non-sparking. Lower housing part 4 closes housing chamber 8 at the bottom. Due to the separate housing chamber 8, the electric motor may be designed completely encapsulated and may be sealed such that the required explosion protection may be reliably guaranteed for the entire service life of such a valve.

The bottom of lower housing part 4 is depressed as a receptacle 10 for a central, cylindrical control rod 16. The motor shaft of the motor supports a motor gear 11 on the end side. Motor gear 11 acts on an intermediated gear 12 which is mounted on lower housing part 4 and drives an additional intermediate gear 13. A small output gear 14 sits on the shaft of intermediate gear 13. Output gear 14 itself drives an adjusting nut element 15 which is mounted between lower housing part 14 and plate 3. During rotation around its axis, adjusting nut element 15 actuates control rod 16 according to a type of sliding screw drive (nut-threaded spindle drive). Control rod 16 displaces shut-off body 5, which is secured against rotation, translationally in both directions. Control rod 16 and shut-off body 5 may be made from two separate parts, in that their shafts are inserted into one another, as depicted, or they may be manufactured from one single plastic molded part in an injection molding process. A sleeve 17 molded onto plate 3 ensures a non-rotatability of control rod 16 and shut-off body 5. The mushroom-shaped, streamlined, optimized shut-off body 5 is, in the position as drawn relative to the gas outlet 7, drawn in a completely open position. The bottom 10 of lower housing part 4 functions as a stop for control rod 16 in the open state of the shut-off valve.

A slider 20, which has stops 21, 22 at the ends thereof, is guided laterally in the valve housing. Shut-off body 5 touches slider 20 at upper stop 21 with a projection 23; lower stop 22 corresponds with a sensor 24 installed at the housing bottom of lower part 4.

FIG. 8 shows the valve in the unbiased, closed state. Shut-off body 5 is moved upwards by the motor. Projection 23 on shut-off body 5 hooks behind upper stop 21 and brings slider 20 along. Sensor 24 responds to the displacement path of slider 20 and causes a switching off of the motor current as soon as shut-off body 5 has reached the unbiased, closed state thereof. As a consequence, shut-off body 5 does not initially move into a biased position, in contrast to the two previously described embodiments. By this means, an energy savings occurs. Any suitable electromechanical or electronic component, which may register a change in distance or a flow change, for example, a micro sensor, Hall sensor, ultrasonic sensor, or a hot wire flow sensor, may be used as sensor 24.

The position detection device for the shut-off body may naturally be dimensioned such that the shut-off body is moved up into a biased, closed position, and then an unbiasing is carried out by means of a return stroke.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A method of operating a shut-off valve comprising:
   providing the valve for integration in a gas meter, comprising:
   a shut-off body which is movable longitudinally relative to a valve seat by a motor-driven reduction transmission with an integrated nut-threaded spindle drive;
   wherein the shut-off body is movable by the motor-driven reduction transmission and remains in one of an open valve position, a closed, tensioned valve position, and a closed, relaxed valve position;
   wherein when switching the valve to a closed position, the shut-off body initially is moved to the closed, tensioned valve position where the shut-off body is compressed against the valve seat for maintaining a gas-tightness from an open valve position, and subsequently is moved to the closed, relaxed valve position where the shut-off body is relaxed by moving back while maintaining a gas-tightness by the motor-driven reduction transmission;
   wherein in a motion direction of the shut-off body, a distance between the shut-off body and the valve seat at the closed, relaxed valve position, is greater that a distance between the shut-off body and the valve seat at the closed, tensioned valve position.

2. The method of claim 1 wherein detectors directly or indirectly detect the position of the shut-off body.

3. The method of claim 1, wherein during the switching of the valve into the closed position, the shut-off body is in a time-controlled way moved to the closed, relaxed valve position while maintaining the gas-tightness of the valve.

* * * * *